United States Patent
Wang et al.

(10) Patent No.: US 10,634,779 B2
(45) Date of Patent: Apr. 28, 2020

(54) TARGET RECOGNITION SYSTEM, TARGET RECOGNITION METHOD, AND STORAGE MEDIUM

(71) Applicant: HONDA MOTOR CO., LTD., Minato-ku, Tokyo (JP)

(72) Inventors: Daihan Wang, Wako (JP); Hiroshi Miura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 131 days.

(21) Appl. No.: 15/990,887

(22) Filed: May 29, 2018

(65) Prior Publication Data

US 2018/0348360 A1  Dec. 6, 2018

(30) Foreign Application Priority Data

May 31, 2017  (JP) .................. 2017-107856

(51) Int. Cl.
*G01S 13/86* (2006.01)
*G06K 9/00* (2006.01)
(Continued)

(52) U.S. Cl.
CPC ............ *G01S 13/867* (2013.01); *G01S 7/354* (2013.01); *G01S 11/12* (2013.01); *G01S 13/865* (2013.01);
(Continued)

(58) Field of Classification Search
CPC . G06T 7/70; G06T 7/292; G01S 13/32; G01S 13/584; G01S 13/862;
(Continued)

(56) References Cited

FOREIGN PATENT DOCUMENTS

| JP | 07-182484 | 7/1995 |
|----|-----------|--------|
| JP | 2002-099907 | 4/2002 |

(Continued)

OTHER PUBLICATIONS

Japanese Notice of Allowance for Japanese Patent Application No. 2017-107856 dated Jan. 8, 2019.
Satake, et al. "Person tracking for mobile robot using stereo camera", IEICE Technical Report, Japan, The Institute of Electronics, Information and Communication Engineers (IEICE), Oct. 16, 2018, vol. 108, No. 263, pp. 37-42, https://ci.nii.ac.jp/naid/110007101140.
Japanese Office Action for Japanese Patent Application No. 2019-021020 dated Jan. 28, 2020. *Reviewed English Translation of Rejection.
(Continued)

*Primary Examiner* — Christopher Wait
(74) *Attorney, Agent, or Firm* — Amin, Turocy & Watson, LLP

(57) ABSTRACT

A target recognition system includes: a first recognition device which recognizes a target; a second recognition device which recognizes a target and differs from the first recognition device; a first processing unit which determines whether the target recognized by the first recognition device or the second recognition device is a new target which has not been recognized in the past on the basis of recognition results of the first recognition device and the second recognition device; a second processing unit which predicts a future position and speed of the target recognized by the first recognition device or the second recognition device when the first processing unit determines that the target recognized by the first recognition device or the second recognition device is not a new target; and a third processing unit which determines whether excessive detection has occurred in the first recognition device or the second recognition device on the basis of the recognition results of the first recognition device and the second recognition device.

7 Claims, 5 Drawing Sheets

(51) Int. Cl.
*G01S 17/93* (2020.01)
*G01S 11/12* (2006.01)
*G01S 17/02* (2020.01)
*G01S 17/58* (2006.01)
*G01S 7/35* (2006.01)
*G01S 13/93* (2020.01)
*G01S 13/931* (2020.01)

(52) U.S. Cl.
CPC .......... *G01S 13/931* (2013.01); *G01S 17/023* (2013.01); *G01S 17/58* (2013.01); *G01S 17/936* (2013.01); *G06K 9/00805* (2013.01); *G06K 9/00818* (2013.01); *G06K 9/00825* (2013.01)

(58) Field of Classification Search
CPC ...... G01S 13/865; G01S 13/867; G01S 13/89; G01S 13/06; G01S 17/06; G06K 9/209; G06K 9/6292; G06K 9/00805; G01P 3/38
See application file for complete search history.

(56) References Cited

FOREIGN PATENT DOCUMENTS

| | | |
|---|---|---|
| JP | 2005-326296 | 11/2005 |
| JP | 2013-190421 | 9/2013 |
| JP | 2014-137288 | 7/2014 |
| JP | 2015-059808 | 3/2015 |
| JP | 2016-009474 | 1/2016 |
| JP | 2016-224785 | 12/2016 |

OTHER PUBLICATIONS

Suganuma, et al. "Trend and Example of Autonomous Vehicle", The Journal of the Institute of Electronics, Information and Communication Engineers, Japan, the Institute of Electronics, Information and Communication Engineers, Jan. 1, 2015, vol. 98, No. 1, pp. 48 to 53 *Looked at the pictures—No English Translation Provided.

TARGET RECOGNITION SYSTEM, TARGET RECOGNITION METHOD, AND STORAGE MEDIUM

CROSS-REFERENCE TO RELATED APPLICATION

Priority is claimed on Japanese Patent Application No. 2017-107856, filed May 31, 2017, the content of which is incorporated herein by reference.

BACKGROUND OF THE INVENTION

Field of the Invention

The present invention relates to a target recognition system, a target recognition method, and a storage medium.

Description of Related Art

Conventionally, a technology for recognizing an object in front of a relevant vehicle is known (refer to Japanese Unexamined Patent Application, First Publication No. H07-182484, for example).

SUMMARY OF THE INVENTION

In the conventional technology, excessive detection in each of a plurality of elements constituting a sensor fusion was not determined by an appropriate means and thus a processing speed was reduced.

An object of the present invention devised in view of the aforementioned circumstances is to provide a target recognition system, a target recognition method, and a storage medium capable of improving a processing speed.

A vehicle control system, a vehicle control method, and a storage medium according to the present invention employ the following configurations.

(1) One aspect of the present invention is a target recognition system including: a first recognition device which recognizes a target; a second recognition device which recognizes a target and differs from the first recognition device; a first processing unit which determines whether the target recognized by the first recognition device or the second recognition device is a new target which has not been recognized in a past on the basis of recognition results of the first recognition device and the second recognition device; a second processing unit which predicts a future position and speed of the target recognized by the first recognition device or the second recognition device when the first processing unit determines that the target recognized by the first recognition device or the second recognition device is not a new target; and a third processing unit which determines whether excessive detection has occurred in the first recognition device or the second recognition device on the basis of the recognition results of the first recognition device and the second recognition device.

(2) In the target recognition system of the aspect (1), the third processing unit determines that excessive detection has occurred in the first recognition device or the second recognition device when a position and a speed of the target at a certain point in time in a future predicted by the second processing unit differ from a position and a speed of the target recognized by the first recognition device or the second recognition device at the point in time, and the target recognized by the first recognition device differs from the target recognized by the second recognition device.

(3) In the target recognition system of the aspect (1) or (2), the third processing unit determines whether excessive detection has occurred in the first recognition device or the second recognition device on the basis of map information including sign information.

(4) In the target recognition system of any one of the aspects (1) to (3), the first recognition device includes a camera, an image recognition unit which recognizes a target by analyzing an image of the camera, and a radar which recognizes a target on the basis of electromagnetic waves reflected by the target and outputs positions and speeds of targets determined to be identical among targets recognized by each of the image recognition unit and the radar to the first processing unit and the third processing unit.

(5) In the target recognition system of any one the aspects (1) to (4), the second recognition device includes a camera, an image recognition unit which recognizes a target by analyzing an image of the camera, and a LIDAR which recognizes a target on the basis of reflected waves of light radiated to the target and outputs positions and speeds of targets determined to be identical among targets recognized by each of the image recognition unit and the LIDAR to the first processing unit and the third processing unit.

(6) Another aspect of the present invention is a target recognition method, performed by an on-board computer mounted in a vehicle including a first recognition device which recognizes a target and a second recognition device which recognizes a target and differs from the first recognition device, the target recognition method including: determining whether the target recognized by the first recognition device or the second recognition device is a new target which has not been recognized in a past on the basis of recognition results of the first recognition device and the second recognition device; predicting a future position and speed of the target recognized by the first recognition device or the second recognition device when it is determined that the target recognized by the first recognition device or the second recognition device is not a new target; and determining whether excessive detection has occurred in the first recognition device or the second recognition device on the basis of the recognition results of the first recognition device and the second recognition device.

(7) Another aspect of the present invention is a storage medium storing a program which causes an on-board computer mounted in a vehicle including a first recognition device which recognizes a target and a second recognition device which recognizes a target and differs from the first recognition device to execute: a process of determining whether the target recognized by the first recognition device or the second recognition device is a new target which has not been recognized in a past on the basis of recognition results of the first recognition device and the second recognition device; a process of predicting a future position and speed of the target recognized by the first recognition device or the second recognition device when it is determined that the target recognized by the first recognition device or the second recognition device is not a new target; and a process of determining whether excessive detection has occurred in the first recognition device or the second recognition device on the basis of the recognition results of the first recognition device and the second recognition device.

According to the above-described aspects (1), (2), (6) and (7), the processing speed can be improved.

According to the above-described aspect (3), unnecessary determination of occurrence of excessive detection can be restrained and thus target recognition accuracy can be further improved.

According to the above-described aspect (4), target recognition accuracy can be improved.

According to the above-described aspect (5), target recognition accuracy can be improved.

DETAILED DESCRIPTION OF THE INVENTION

Hereinafter, embodiments of a target recognition system, a target recognition method, and a storage medium of the present invention will be described with reference to the drawings.

First Embodiment

[System Configuration]

Figure 1:
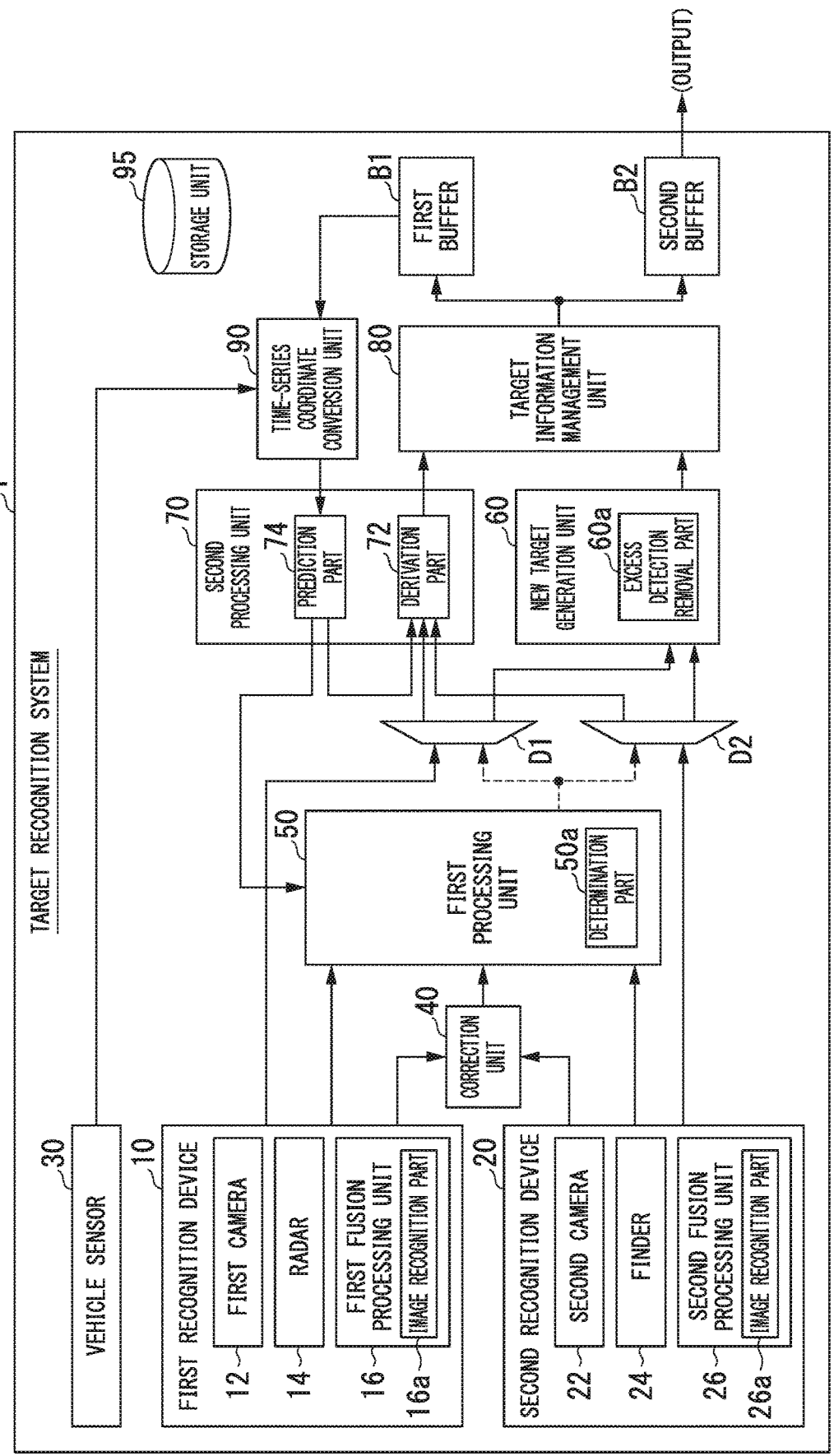
FIG. 1 is a block diagram of a target recognition system of a first embodiment.

FIG. 1 is a block diagram of a target recognition system 1 of a first embodiment. The target recognition system 1 of the first embodiment is mounted in a vehicle (hereinafter referred to as a relevant vehicle M) such as a two-wheeled vehicle, a three-wheeled vehicle or a four-wheeled vehicle, for example. The relevant vehicle M is driven by an internal combustion engine such as a diesel or gasoline engine, a motor or a drive source realized by combining them, for example. The motor operates using power generated by a generator connected to the internal combustion engine or discharge power of a secondary battery or a fuel battery.

For example, the target recognition system 1 includes a first recognition device 10, a second recognition device 20, a vehicle sensor 30, a correction unit 40, a first processing unit 50, a new target generation unit 60, a second processing unit 70, a target information management unit 80, a time series coordinate conversion unit 90, a storage unit 95, a first distributor D1, a second distributor D2, a first buffer B1, and a second buffer B2. The target recognition system 1 may have a configuration which does not include the first recognition device 10, the second recognition device 20 and the vehicle sensor 30 among the aforementioned plurality of components. The first processing unit 50 is an example of a "first processing unit," the second processing unit 70 is an example of a "second processing unit" and the new target generation unit 60 is an example of a "third processing unit."

The aforementioned components (functional units) other than the first recognition device 10, the second recognition device 20, the vehicle sensor 30 and the storage unit 95 are realized by a processor, for example, a central processing unit (CPU), executing a program (software). Some or all of these components may be realized by hardware such as a large scale integration (LSI), an application specific integrated circuit (ASIC) and a field-programmable gate array (FPGA) or realized by software and hardware in cooperation.

The storage unit 95 is realized by a storage device, for example, a hard disk drive (HDD), a flash memory, a random access memory (RAM), a read only memory (ROM) or the like. For example, the storage unit 95 stores a program executed by a processor.

Components (various devices and apparatuses) included in the target recognition system 1 are connected to each other through a multiplex communication line such as a controller area network (CAN) communication line, a serial communication line, a wireless communication network or the like, for example. Information delivery between functional units by means of a program is performed by writing information to a shared region or a register of a memory.

For example, the first recognition device 10 includes a first camera 12, a radar 14 and a first fusion processing unit 16. The first camera 12 is a digital camera using a solid-state imaging device such as a charge coupled device (CCD) and a complementary metal oxide semiconductor (CMOS), for example. One or more first cameras 12 are attached to arbitrary points of the relevant vehicle M. When a front view is photographed, the first camera 12 is attached to an upper part of the front windshield, the rear side of the rear-view mirror or the like. For example, the first camera 12 periodically repeatedly photographs surroundings of the relevant vehicle M. The first camera 12 may be a stereo camera.

The radar 14 radiates radio waves such as millimeter waves to the surroundings of the relevant vehicle M and detects radio waves (reflected waves) reflected by a target to recognize at least the position (distance and direction) of the target. One or more radars 14 may be attached to arbitrary points of the relevant vehicle M. The radar 14 may recognize the position and the speed of a target according to the frequency modulated continuous wave (FM-CW) method or recognize the speed on the basis of variation in time in the recognized position of the target.

The first fusion processing unit 16 includes an image recognition unit (image processing unit) 16a. The image recognition unit 16a may be a component belonging to the first camera 12. The image recognition unit 16a recognizes the position and the speed of a target by analyzing a captured image of the first camera 12. For example, the first fusion processing unit 16 derives the position, the speed, the type (e.g., type such as a vehicle, a pedestrian or a guardrail), a delay amount and the like of the target by performing a sensor fusion process on recognition results obtained by the first camera 12, and the image recognition unit 16a and the radar 14. For example, the position of the target is represented by coordinates and the like in a space (hereinafter referred to as a virtual three-dimensional space) corresponding to the actual space (space based on the width, depth and height) in which the relevant vehicle M is present.

The first fusion processing unit 16 assigns a target ID for identifying a target to each target which is an object for which a position, a speed and the like will be derived. The first fusion processing unit 16 outputs information (hereinafter referred to as first target information) including the position, the speed, the type, a delay amount, a recognition time (sensor fusion process execution time) and the like of each target corresponding to the target ID to the correction unit 40 and the first distributor D1 and further outputs information on the speed of the target to the first processing unit 50. Although the first recognition device 10 recognizes one target at a time in the following description, the first recognition device 10 may simultaneously recognize a plurality of targets. The same applies to the second recognition device 20.

For example, the second recognition device 20 includes a second camera 22, a finder 24 and a second fusion processing unit 26. For example, the second camera 22 is a digital camera using a solid-state imaging device, such as a CCD and a CMOS, like the first camera 12. One or more second cameras 22 may be attached to arbitrary points of the relevant vehicle M. The second camera 22 periodically repeatedly photographs the surroundings of the relevant vehicle M. The second camera 22 may be a stereo camera.

The finder 24 is a light detection and ranging (LIDAR) which measures scattering light with respect to reflected light and recognizes the position and the speed of a target at least using part of the contour of the target. One or more finders 24 may be attached to arbitrary points of the relevant vehicle M.

The second fusion processing unit 26 includes an image recognition unit (image processing unit) 26a. The image recognition unit 26a may be a component belonging to the second camera 22. The image recognition unit 26a recognizes the position and the speed of a target by analyzing a captured image of the second camera 22. For example, the second fusion processing unit 26 derives the position (position in the virtual three-dimensional space), the speed, the type, the shape, a delay amount and the like of the target by performing a sensor fusion process on recognition results obtained by the second camera 22, and the image recognition unit 26a and the finder 24. The second fusion processing unit 26 assigns a target ID to each target which is an object for which a position, a speed and the like will be derived. The second fusion processing unit 26 outputs information (hereinafter referred to as second target information) including the position, the speed, the shape, the type, a delay amount, a recognition time and the like of each target corresponding to the target ID to the correction unit 40 and the second distributor D2 and further outputs information on the speed of the target to the first processing unit 50.

The vehicle sensor 30 includes a vehicle speed sensor which detects the speed of the relevant vehicle M, an acceleration sensor which detects an acceleration, a yaw rate sensor which detects an angular velocity of the vertical axis, a direction sensor which detects the direction of the relevant vehicle M, and the like, for example. The vehicle sensor 30 outputs information indicating a detection result detected by each sensor to the time series coordinate conversion unit 90.

The correction unit 40 performs correction for synchronizing the positions of targets, which are included in the first target information and the second target information, with reference to the first target information and the second target information. For example, it may be assumed that the first fusion processing unit 16 of the first recognition device 10 repeatedly performs the sensor fusion process in a predetermined period (hereinafter referred to as a first period) and outputs the first target information to the correction unit 40 each time, and the second fusion processing unit 26 of the second recognition device 20 repeatedly performs the sensor fusion process in a period (hereinafter referred to as a second period) shorter or longer than the first period and outputs the second target information to the correction unit 40 each time. In this case, the targets are not necessarily recognized at the same time and target information of the targets recognized at different times may be output to the correction unit 40. Accordingly, the correction unit 40 corrects the recognized positions and speeds of the targets in order to synchronize the first target information and the second target information with each other with reference to a target information recognition time input from each of the first recognition device 10 and the second recognition device 20. Here, the correction unit 40 performs a process such as linear interpolation as necessary to correct information on the positions in one or both of the first target information and the second target information into information when the positions are recognized at a certain reference timing.

The first processing unit 50 determines whether a target (hereinafter referred to as a first target) recognized by the first recognition device 10 and a target (hereinafter referred to as a second target) recognized by the second recognition device 20 are identical on the basis of the target information (target information in which the positions and the speeds of the targets have been corrected) input from the correction unit 40, the target speed information input from each of the first recognition device 10 and the second recognition device 20, and information to be described later input from the second processing unit 70 and, when it is determined that the targets are identical, correlates the targets determined to be identical with each other. "Correlating" includes, for example, assigning identification information (common target ID) representing one target to two targets.

Further, the first processing unit 50 determines whether each of the first target and the second target is a target recognized in the past (hereinafter referred to as a recognized target) and outputs a control signal (a broken line arrow in the figure) for switching output destinations of the first distributor D1 and the second distributor D2 on the basis of the determination result.

The first processing unit 50 causes the first distributor D1 to output the first target information input from the first recognition device 10 to the second processing unit 70 when it is determined that the first target is a recognized target, and causes the first distributor D1 to output the first target information input from the first recognition device 10 to the new target generation unit 60 when it is determined that the first target is not a recognized target. Here, the first processing unit 50 may output information indicating that the first target and the second target are correlated with each other to the new target generation unit 60 or the second processing unit 70.

The first processing unit 50 causes the second distributor D2 to output the second target information input from the second recognition device 20 to the second processing unit 70 when it is determined that the second target is a recognized target, and causes the second distributor D2 to output the second target information input from the second recognition device 20 to the new target generation unit 60 when it is determined that the second target is not a recognized target. Here, the first processing unit 50 may output the information indicating that the first target and the second target are correlated with each other to the new target generation unit 60 or the second processing unit 70.

The first processing unit 50 includes a determination unit 50a. The determination unit 50a determines whether the state of the first recognition device 10 or the second recognition device 20 is a predetermined state on the basis of recognition results obtained by the first recognition device 10 and the second recognition device 20 and a prediction result to be described later obtained by a prediction unit 74 of the second processing unit 70. For example, the predetermined state includes a state in which there is a disjunction between the attachment state of each of the first recognition device 10 and the second recognition device 20 and the supposition of the system (e.g., an axial deviation state).

When target information is input from each distributor, the new target generation unit 60 outputs the input target information to the target information management unit 80 and outputs the target ID assigned to the target indicated by the target information to the target information management unit 80 as identification information of a new target.

The new target generation unit 60 includes an excessive detection elimination unit 60a. The excessive detection elimination unit 60a determines that excessive detection has not occurred when the first target and the second target are correlated with each other by the first processing unit 50, that is, when the first target and the second target are identical. The excessive detection elimination unit 60a may immediately determine that excessive detection has occurred when the first target and the second target are not correlated with each other by the first processing unit 50, that is, when the first target and the second target are not identical or may determine that excessive detection has occurred when a predetermined condition is satisfied as in a second embodiment which will be described later.

The new target generation unit 60 outputs information about the first target represented by the first target information and the second target represented by the second target information to the target information management unit 80, for example, when the excessive detection elimination unit 60a does not determine that excessive detection has occurred. Information about each target includes the first target information and the second target information when the first target and the second target are not correlated with each other and further includes a common target ID in addition to the first target information and the second target information when the first target and the second target are correlated with each other.

The second processing unit 70 includes a derivation unit 72 and the prediction unit 74, for example. The derivation unit 72 derivates the position and the speed of a target, for example, on the basis of information output by the prediction unit 74 and information input from each distributor. For example, the derivation unit 72 derivates averages of the positions and the speeds of the first target and the second target correlating with each other as identical targets and future positions and speeds of the targets predicted by the prediction unit 74. The derivation unit 72 outputs the derivation result to the target information management unit 80.

The prediction unit 74 predicts future positions and speeds of the first target and the second target correlated with each other using a time series filter, for example. The time series filter is an algorithm for predicting a future state of an observation object (a target in the embodiment), for example, a Kalman filter, a particle filter and the like. For example, the prediction unit 74 obtains positions and speeds derived by the time series filter as a prediction result by using the latest derivation result of the derivation unit 72 as an input to the time series filter. The prediction unit 74 outputs the prediction result of the future positions and speeds of the targets to each of the first processing unit 50 and the derivation unit 72.

The target information management unit 80 manages the positions and the speeds of the first target and the second target correlated with each other as identical targets at each recognition time by storing the derivation result of the derivation unit 72 in the storage unit 95 on the basis of a processing result of the new target generation unit 60, for example.

The target information management unit 80 outputs the derivation result of the derivation unit 72 to the time series coordinate conversion unit 90 via the first buffer B1 and to a higher device via the second buffer B2. For example, the higher device is a device which automatically performs speed control and steering control of the relevant vehicle M using a recognition result of the target recognition system 1 or supports one or both of speed control and steering control.

The time series coordinate conversion unit 90 converts (corrects) the position of a target input from the target information management unit 80 via the first buffer B1 on the basis of information input from the vehicle sensor 30, for example. The time series coordinate conversion unit 90 performs coordinate conversion of the position of the target in the virtual three-dimensional space obtained through the sensor fusion process depending on a variation in time in a relative distance and a relative speed between the target and the relevant vehicle M. The time series coordinate conversion unit 90 outputs target information including the converted position to the prediction unit 74.

[Process Flow]

Figure 2:
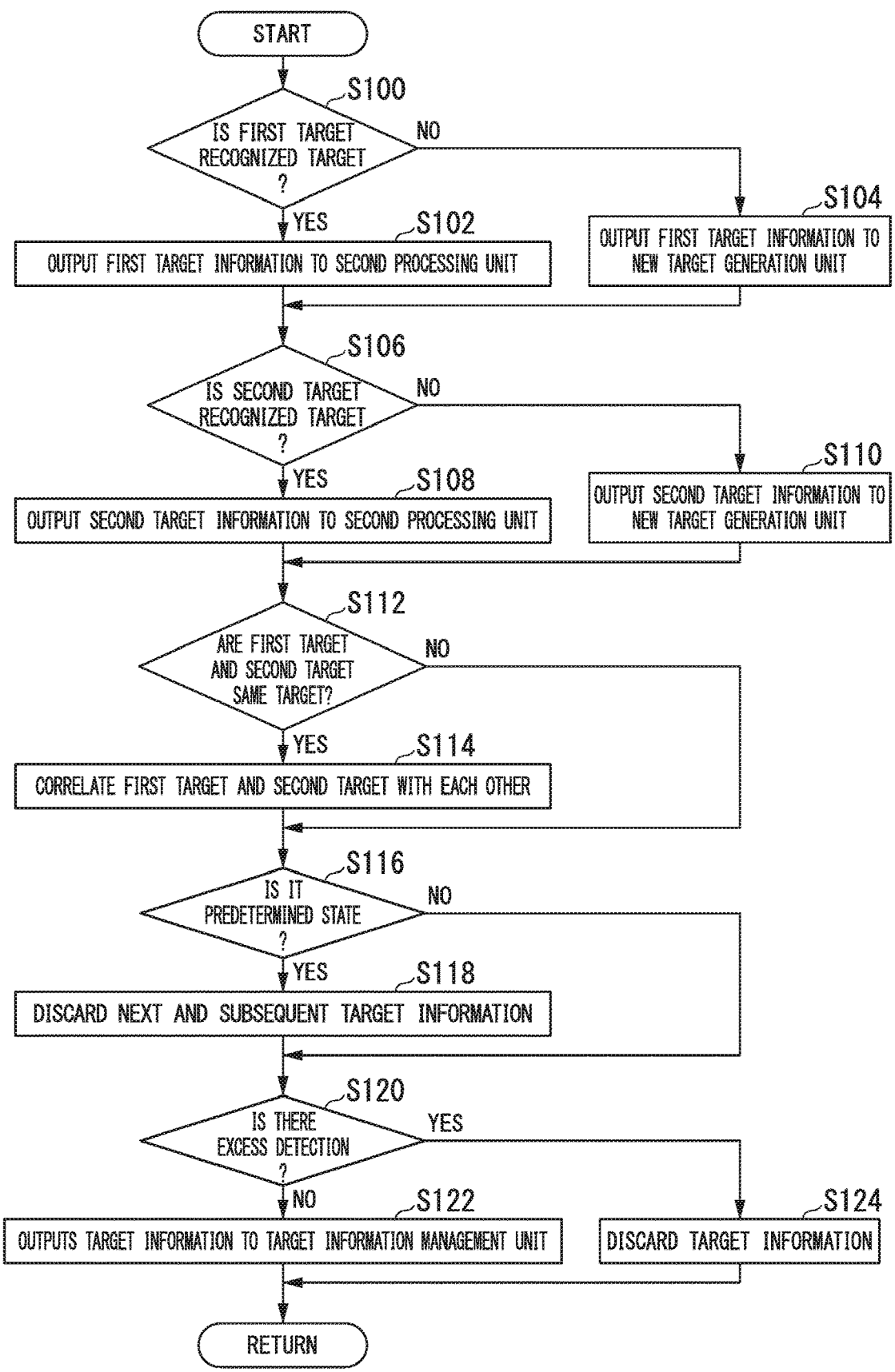
FIG. 2 is a flowchart illustrating a series of processes performed by the target recognition system.

Hereinafter, a series of processes performed by the target recognition system 1 will be described using a flowchart. FIG. 2 is a flowchart illustrating a series of processes performed by the target recognition system 1. The processes of this flowchart may be repeatedly performed in a predetermined period, for example.

First, the first processing unit 50 determines whether the first target represented by the first target information is a recognized target (step S100). For example, the first processing unit 50 determines whether differences between the position and the speed of the first target and a position and a speed of a target previously predicted by the prediction unit 74 are within an allowable range, determines that the first target is a recognized target when the differences are within the allowable range, and determines that the first target is not a recognized target when the differences are not within the allowable range.

The first processing unit 50 controls the first distributor D1 to output the first target information to the second processing unit 70 when the first target is determined to be a recognized target (step S102) and controls the first distributor D1 to output the first target information to the new target generation unit 60 when the first target is determined to be a new target instead of a recognized target (step S104).

Subsequently, the first processing unit 50 determines whether the second target represented by the second target information is a recognized target (step S106). For example, the first processing unit 50 determines whether differences between the position and speed of the second target and the position and the speed of the target previously predicted by the prediction unit 74 are within an allowable range, determines that the second target is a recognized target when the differences are within the allowable range, and determines that the second target is not a recognized target when the differences are not within the allowable range, as in the process (process of step S100) of determining whether the first target is a recognized target.

The first processing unit 50 controls the second distributor D2 to output the second target information to the second processing unit 70 when the second target is determined to be a recognized target (step S108) and controls the second distributor D2 to output the second target information to the new target generation unit 60 when the second target is determined to be a new target instead of a recognized target (step S110).

When one or both of the first target information and the second target information are input, the derivation unit 72 of the second processing unit 70 derives a position and a speed of a target at that point in time on the basis of the positions and the speeds of one or both of the first target and the second target and the position and speed of the target previously predicted by the prediction unit 74. For example, the derivation unit 72 derives averages of the position and the speed of a target included in input target information and the previously predicted position and speed of the target and the like as the position and the speed of the target at that point in time and outputs the derivation result to the target information management unit 80.

Then, the first processing unit 50 compares the first target information with the second target information to determine whether the first target and the second target are identical (step S112).

For example, the first processing unit 50 determines whether differences between the position and the speed of the first target and the position and the speed of the second target are within an allowable range, determines that the first target and the second target are identical when the differences between the position and the speed of the first target and the position and the speed of the second target are within the allowable range and assigns a common target ID to the first target and the second target to correlate the two targets with each other (step S114).

On the other hand, the first processing unit 50 omits the process of S114 when the differences between the position and the speed of the first target and the position and the speed of the second target are not within the allowable range Subsequently, the determination unit 50a of the first processing unit 50 determines whether the state of the first recognition device 10 or the second recognition device 20 is the predetermined state on the basis of the recognition results of both the first recognition device 10 and the second recognition device 20 and the prediction result of the prediction unit 74 of the second processing unit 70 (step S116).

For example, when the first target and the second target are not identical, one target is a recognized target and the other target is a new target, the determination unit 50a determines that a recognition device which has recognized the target determined to be a new target is in the predetermined state.

When the first target and the second target are not identical and both the two targets are recognized targets or new targets, the determination unit 50a determines that any one of the first recognition device 10 and the second recognition device 20 is in the predetermined state.

The first processing unit 50 determines that next-time and following target information of the recognition device in the predetermined state will be discarded (eliminated) (step S118). Accordingly, the target correlation process of S112, S114 and the like is omitted. In this case, the prediction unit 74 repeats prediction of a future position and speed of a target using only target information of the recognition device which is not in the predetermined state while any one recognition device is in the predetermined state.

When it is impossible to discriminate whether any one of the recognition devices is in the predetermined state, the first processing unit 50 may determine that next-time and following target information of both of the recognition devices will be discarded and end the processes of this flowchart.

Figure 3:
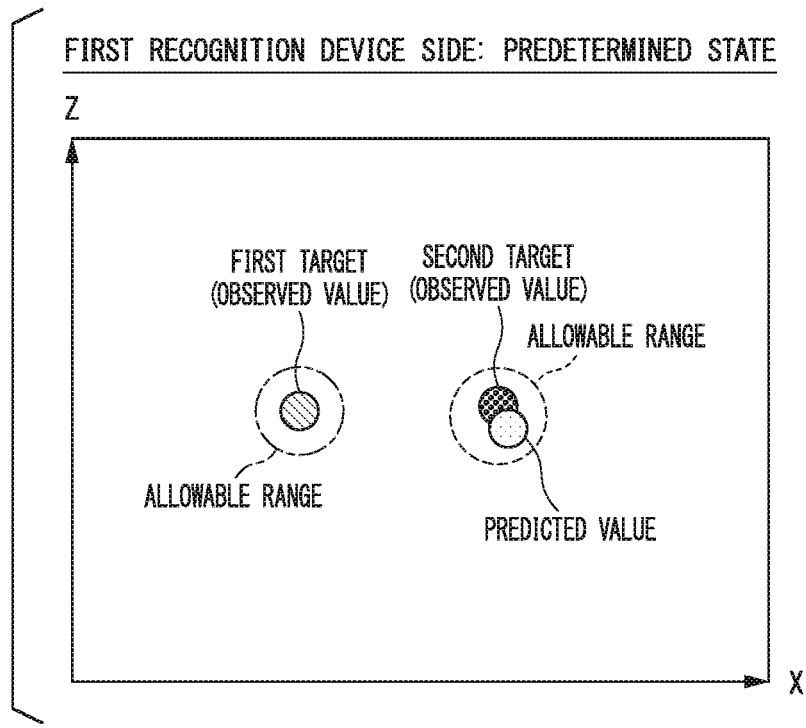
FIG. 3 is a diagram illustrating an example of a situation determined to be a predetermined state by a recognition device.

FIG. 3 is a diagram illustrating an example of a situation in which a recognition device is determined to be in the predetermined state. The illustrated example shows the position of each target in one plane (x-z plane) in a virtual three-dimensional space (x-y-z space). As in the illustrated example, when the second target is not present within an allowable range based on the position of the first target and a predicted position is present within an allowable range based on the position of the second target, the determination unit 50a determines that the first target is a new target and the second target is a recognized target. Here, when the first target and the second target are separated from each other by an allowable range or more, as in the illustrated example, the determination unit 50a determines that the second recognition device 20 is not in the predetermined state and the first recognition device 10 is in the predetermined state.

Figure 4:
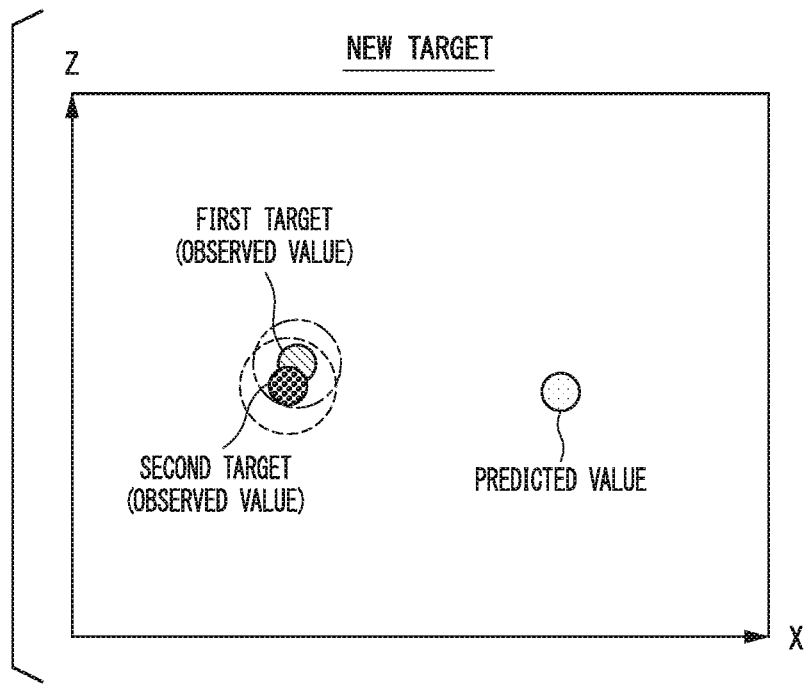
FIG. 4 is a diagram illustrating an example of a situation in which a first target and a second target are determined to be unrecognized targets.

FIG. 4 is a diagram illustrating an example of a situation in which the first target and the second target are determined to be new objects. As in the illustrated example, when a predicted position is not present within an allowable range of each target although the second target is present within an allowable range based on the position of the first target, the determination unit 50a determines that the first target and the second target are identical and both new targets.

Figure 5:
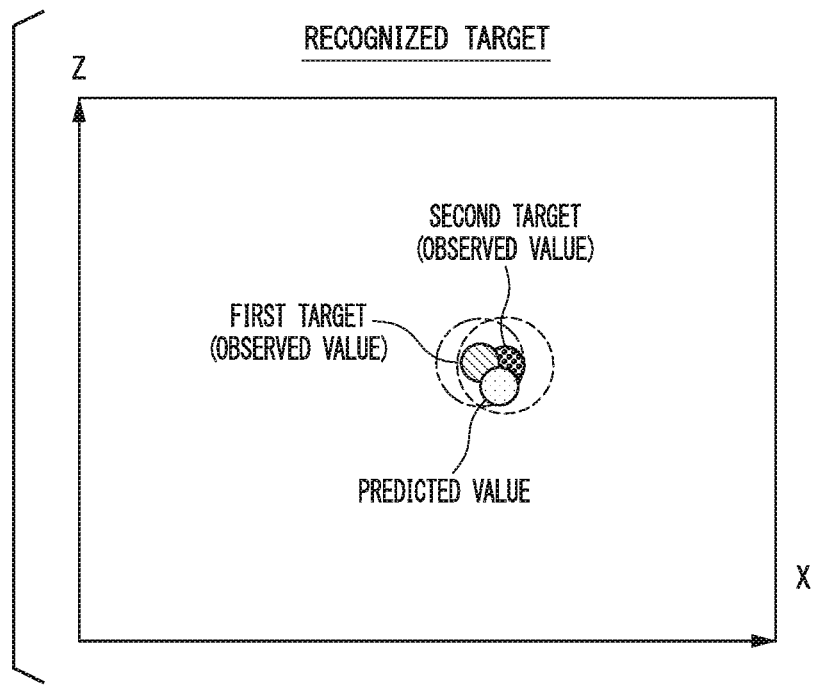
FIG. 5 is a diagram illustrating an example of a situation in which the first target and the second target are determined to be recognized targets.

FIG. 5 is a diagram illustrating an example of a situation in which the first target and the second target are determined to be recognized targets. As in the illustrated example, when the second target is present within an allowable range based on the position of the first target and a predicted position is present within the allowable range of each target, the determination unit 50a determines that the first target and the second target are identical and both recognized targets.

Next, the excessive detection elimination unit 60a of the new target generation unit 60 determines whether excessive detection has occurred in a recognition result obtained by the first recognition device 10 or the second recognition device 20 depending on whether the first target and the second target are correlated with each other in the process of S114 when target information is input from the recognition devices via each distributor (step S120).

For example, the excessive detection elimination unit 60a determines that excessive detection has not occurred when the first target and the second target assigned a common target ID are correlated with each other, that is, when the first target and the second target are identical, and determines that excessive detection has occurred when the first target and the second target to which the common target ID is not assigned are not correlated with each other, that is, when the first target and the second target are not identical.

The new target generation unit 60 outputs the target information input from the recognition devices to the target information management unit 80 when it is determined that excessive detection has not occurred (step S122). The target information management unit 80 receives the target information and stores the target information of a new target in the storage unit 95. The target information management unit 80 outputs the target information of the new target to the time series coordinate conversion unit 90 via the first buffer B1 and to a higher device via the second buffer B2.

On the other hand, the new target generation unit 60 discards the target information input from the recognition devices when it is determined that excessive detection has occurred (step S124). In this manner, the processes of this flowchart end.

According to the above-described first embodiment, the target recognition system includes the first recognition device 10 which recognizes the position and the speed of a target using reflected waves from the target, the second recognition device 20 which recognizes the position and the speed of a target at least using part of the contour of the target, the new target generation unit 60 which determines whether a new target needs to be generated on the basis of the recognition results of the first recognition device 10 and the second recognition device 20, and the second processing unit 70 which at least predicts the position and the speed of a previously recognized target, which will be detected this time, at least using the determination result of the new target generation unit 60, wherein the new target generation unit 60 determines whether excessive detection has occurred in the first recognition device or the second recognition device, and thus the processing speed can be improved.

For example, the determination unit 50*a* is caused to perform the process in the same step as that performed by the first processing unit 50, and thus the derivation unit 72 need not perform the process in the following step, improving the processing speed.

Since the determination unit 50*a* determines whether each recognition device is in the predetermined state, and thus a recognition result of a recognition device, which is in a state in which the recognition result originally cannot be used for target recognition due to an axial deviation and the like, is not used, target recognition accuracy can be improved.

According to the above-described first embodiment, the excessive detection elimination unit 60*a* discards target information when excessive detection has occurred, and thus a position and a speed of a target determined to be excessive detection can be excluded from input to the time series filter of the prediction unit 74. As a result, even when the position and the speed of a target are temporarily deviated from recognition results so far due to occurrence of excessive detection, the target information is not reflected in the following prediction process and thus the target can be continuously recognized with accuracy.

Second Embodiment

Hereinafter, a second embodiment will be described. The second embodiment differs from the above-described first embodiment in that, when the relevant vehicle M travels in a predetermined section identified in advance as a section in which excessive detection easily occurs, the excessive detection elimination unit 60*a* operates in the predetermined section and does not operate in other sections. The following description will focus on differences from the first embodiment and description of the same functions and the like as those of the first embodiment will be omitted.

[System Configuration]

Figure 6:
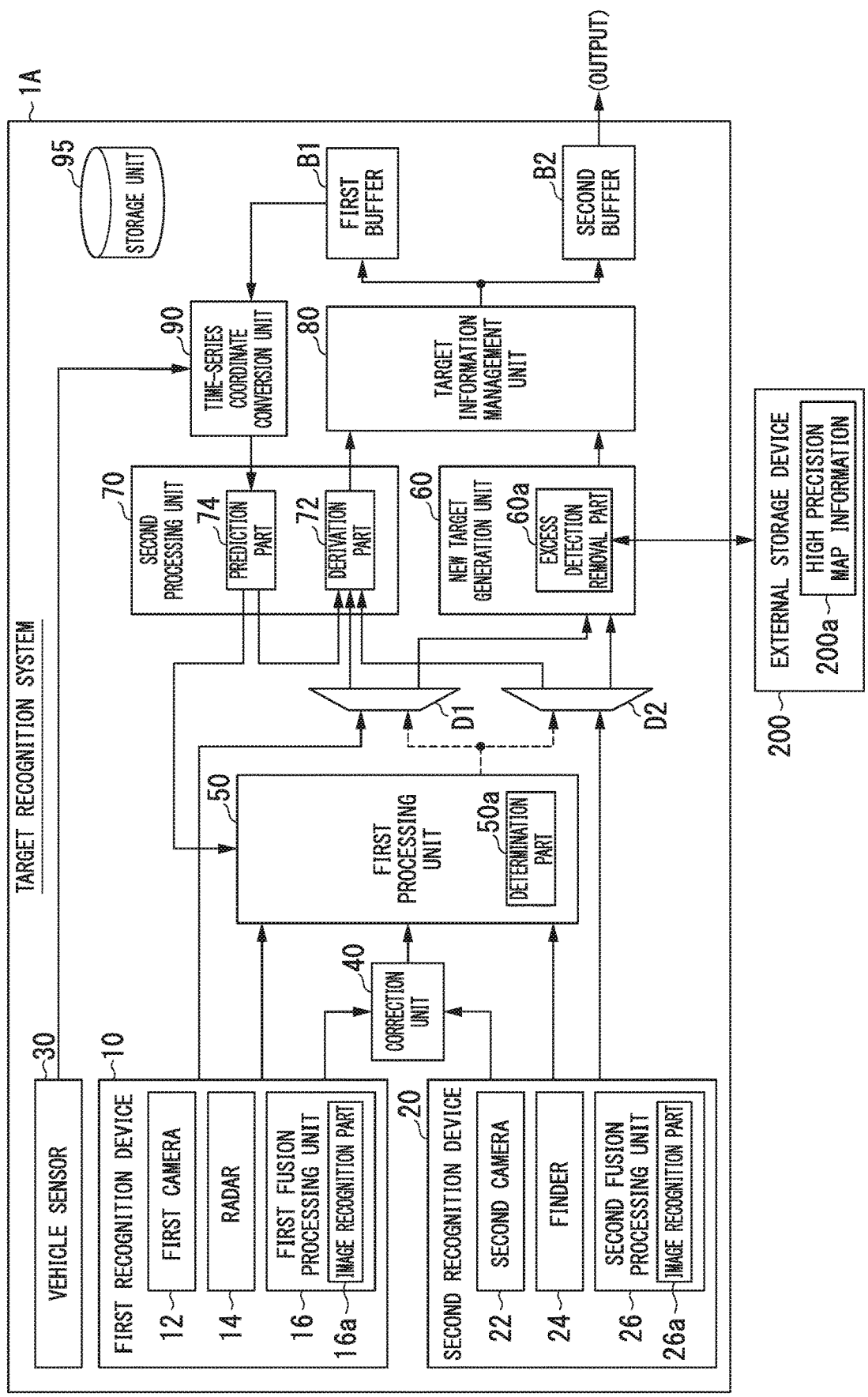
FIG. 6 is a block diagram of a target recognition system of a second embodiment.

FIG. 6 is a block diagram of a target recognition system 1A of the second embodiment. For example, the excessive detection elimination unit 60*a* of the target recognition system 1A of the second embodiment performs wired or wireless communication with an external storage device 200 and refers to highly accurate map information 200*a* stored in the external storage device 200. The highly accurate map information 200*a* includes information about the centers of lanes or information about the boundaries of lanes, for example. The highly accurate map information 200*a* includes information representing road types such as an expressway, a toll road, a national highway and a prefectural road, and information such as reference speeds of roads, the number of lanes, the width of each lane, gradients of roads, locations of roads (3-dimensional coordinates including a longitude, a latitude and a height), curvatures of curves of roads or each lane of the roads, positions of merging and branching points of lanes, signs installed on roads, etc.

For example, the excessive detection elimination unit 60*a* determines whether a predetermined section is present in a route through which the relevant vehicle M will travel with reference to the highly accurate map information 200*a*. The predetermined section is a section in which excessive detection easily occurs, as described above, and is a section having a road information bulletin board displaying road surface freezing and congestion information of roads or collision impact buffers installed at lane merging and branching points, for example. For example, when the route includes the predetermined section and the relevant vehicle M has arrived at the predetermined section, the excessive detection elimination unit 60*a* starts an excessive detection determination process. On the other hand, when the relevant vehicle M does not arrive at the predetermined section or the scheduled route does not include the predetermined section, the excessive detection elimination unit 60*a* stops the excessive detection determination process. In this manner, the excessive detection determination process is performed only on a section recognized in advance as a section in which excessive detection easily occurs, and thus unnecessary determination of occurrence of excessive detection can be curbed further improving target recognition accuracy.

When presence or absence of excessive detection is determined on the basis of a predetermined index value such as a probability or a reliability, the excessive detection elimination unit 60*a* of the second embodiment may perform excessive detection determination by changing threshold values with respect to index values in the predetermined section and other sections. For example, the excessive detection elimination unit 60*a* comprehensively determines target information output by the first recognition device 10 or the second recognition device 20 and the determination result of the determination unit 50*a* of the first processing unit 50 to derive an index value indicating a degree of excessive detection which has occurred and determines that excessive detection has occurred when the index value is equal to or greater than a threshold value. Here, the excessive detection elimination unit 60*a* decreases the threshold value with respect to the index value in the predetermined section such that determination of excessive detection becomes easy to perform and increases the threshold value in other sections such that determination of excessive detection becomes difficult to perform. Accordingly, unnecessary determination of occurrence of excessive detection can be curbed and thus target recognition accuracy can be further improved.

According to the above-described second embodiment, determination of occurrence of excessive detection is easy to perform in a section in which excessive detection easily occurs and determination of occurrence of excessive detection is difficult to perform in other sections, and thus unnecessary determination of occurrence of excessive detection can be curbed. As a result, it is possible to further improve target recognition accuracy.

While preferred embodiments of the invention have been described and illustrated above, it should be understood that these are exemplary of the invention and are not to be considered as limiting and additions, omissions, substitutions, and other modifications can be made without departing from the spirit or scope of the present invention.

What is claimed is:

1. A target recognition system comprising:
   a first recognition device which recognizes a target;
   a second recognition device which recognizes a target and differs from the first recognition device;
   a first processing unit which determines whether the target recognized by the first recognition device or the second recognition device is a new target which has not been recognized in a past on the basis of recognition results of the first recognition device and the second recognition device;
   a second processing unit which predicts a future position and speed of the target recognized by the first recognition device or the second recognition device when the first processing unit determines that the target recognized by the first recognition device or the second recognition device is not a new target; and a third processing unit which determines whether excessive detection has occurred in the first recognition device or the second recognition device on the basis of the recognition results of the first recognition device and the second recognition device.

2. The target recognition system according to claim 1, wherein the third processing unit determines that excessive detection has occurred in the first recognition device or the second recognition device when a position and a speed of the target at a certain point in time in a future, predicted by the second processing unit, differ from a position and a speed of the target, recognized by the first recognition device or the second recognition device at the point in time, and the target recognized by the first recognition device differs from the target recognized by the second recognition device.

3. The target recognition system according to claim 1, wherein the third processing unit determines whether excessive detection has occurred in the first recognition device or the second recognition device on the basis of map information including sign information.

4. The target recognition system according to claim 1, wherein the first recognition device includes a camera, an image recognition unit which recognizes a target by analyzing an image of the camera, and a radar which recognizes a target on the basis of electromagnetic waves reflected by the target, and outputs positions and speeds of targets determined to be identical among targets recognized by each of the image recognition unit and the radar to the first processing unit and the third processing unit.

5. The target recognition system according to claim 1, wherein the second recognition device includes a camera, an image recognition unit which recognizes a target by analyzing an image of the camera, and a LIDAR which recognizes a target on the basis of reflected waves of light radiated to the target, and outputs positions and speeds of targets determined to be identical among targets recognized by each of the image recognition unit and the LIDAR to the first processing unit and the third processing unit.

6. A target recognition method, performed by an on-board computer mounted in a vehicle including a first recognition device which recognizes a target and a second recognition device which recognizes a target and differs from the first recognition device, the target recognition method comprising:

determining whether the target recognized by the first recognition device or the second recognition device is a new target which has not been recognized in a past on the basis of recognition results of the first recognition device and the second recognition device;

predicting a future position and speed of the target recognized by the first recognition device or the second recognition device when it is determined that the target recognized by the first recognition device or the second recognition device is not a new target; and determining whether excessive detection has occurred in the first recognition device or the second recognition device on the basis of the recognition results of the first recognition device and the second recognition device.

7. A non-transitory storage medium storing a program which causes an on-board computer mounted in a vehicle including a first recognition device which recognizes a target and a second recognition device which recognizes a target and differs from the first recognition device to execute:

a process of determining whether the target recognized by the first recognition device or the second recognition device is a new target which has not been recognized in a past on the basis of recognition results of the first recognition device and the second recognition device;

a process of predicting a future position and speed of the target recognized by the first recognition device or the second recognition device when it is determined that the target recognized by the first recognition device or the second recognition device is not a new target; and a process of determining whether excessive detection has occurred in the first recognition device or the second recognition device on the basis of the recognition results of the first recognition device and the second recognition device.

* * * * *